United States Patent
Jones et al.

(10) Patent No.: US 7,327,231 B2
(45) Date of Patent: Feb. 5, 2008

(54) FAILSAFE DISABLE IN A VEHICLE SECURITY SYSTEM

(75) Inventors: Mark Jones, Long Beach, CA (US); Marshall Moore, Danville, CA (US)

(73) Assignee: Magnadyne Corporation, Compton, CA (US)

( * ) Notice: Subject to any disclaimer, the term of this patent is extended or adjusted under 35 U.S.C. 154(b) by 174 days.

(21) Appl. No.: 11/020,911

(22) Filed: Dec. 23, 2004

(65) Prior Publication Data
US 2006/0138863 A1    Jun. 29, 2006

(51) Int. Cl.
*B60R 25/10* (2006.01)
(52) U.S. Cl. .............. 340/426.13; 340/425.5; 340/426.1; 340/426.13
(58) Field of Classification Search .......... 340/426.13, 340/425.5, 426.1, 426.14
See application file for complete search history.

(56) References Cited

U.S. PATENT DOCUMENTS 6,980,124 B2 * 12/2005 Kong et al. ............ 340/870.11

* cited by examiner

*Primary Examiner*—Daryl C Pope
(74) *Attorney, Agent, or Firm*—Paul, Hastings, Janofsky & Walker LLP; Sam Talpalatsky, Esq.

(57) ABSTRACT

The disclosed device is an additional, normally-closed relay positioned in line with the ignition switch and the functionality controlled by the OEM, normally-open relay. When the aftermarket system is in the disarmed state, the normally-closed relay is dormant in its closed position, thereby allowing the circuit to complete its intended loop. When the aftermarket security system is enabled, the normally-closed relay will open the current flow and prevent the current from reaching its target, thereby disrupting or disabling the operation of the vehicle function. If the normally-closed relay fails, it fails in its closed position, thereby not affecting the OEM system.

60 Claims, 2 Drawing Sheets

FAILSAFE DISABLE IN A VEHICLE SECURITY SYSTEM

BACKGROUND

1. Field of the Invention

The present invention relates generally to vehicle security systems, having the ability to disable the normal operation of the vehicle and communicate an alarm state in response to an intrusion or a remote signal.

2. Discussion of Prior Art

Vehicle security systems have evolved over time. One of the more significant contributions of these systems is the remote access to the vehicle and the ability to disable one or more of the normal operating functions, such as the ability to start the vehicle. In an armed state, the prior art systems were designed to prevent the vehicles from starting when an unauthorized person engaged the ignition switch to its start position. To achieve this functionality, the prior art security systems placed a security controller, operable in communication with a remote control transmitter. The controller controlled the operation of a cutoff relay placed in between the ignition switch and the starter solenoid. The current path to the starter solenoid, normally completed by placing the ignition switch to the start position, was interrupted by the cutoff relay when the controller was in its armed state. Thus, the vehicle could not be started. Such cutoff relays followed two distinct functional principles.

One employed a normally-open cutoff relay and the other a normally-closed cutoff relay. In a system employing a normally-open relay, if the relay fails in its biased, normally-open position, the vehicle would not start even if the controller is placed in its disarmed state. This leads to much frustration, safety and security concerns for the vehicle and its operator. It further leads to significant costs. The operator is usually frustrated when his/her vehicle is disabled by a relatively inexpensive, failed relay, especially when this relay is an aftermarket product.

The second principle employed a biased, normally-closed relay. If this relay fails, it fails in its biased, normally closed position. Accordingly the current path from the ignition switch to the starter solenoid is functional and transparent to the user. On the upside, the user is not frustrated by a disabled vehicle. On the downside the vehicle is less secure.

With time, vehicle manufacturers ("OEMs") began to integrate the security and convenience functionality into their vehicles. Aftermarket providers, however, have continued to stay ahead, innovate and offer enticing value-add security and user convenience features not adopted by the OEMs. Accordingly, with the complexity of vehicles' electrical systems, and the entry of OEM security features, aftermarket suppliers are advantaged by coexisting with the OEM functionality and continuing to integrate innovative enhancements in conjunction with the OEM systems.

SUMMARY

The disclosed device is an enhancement to an OEM vehicle security system. An OEM security system typically employs a relay tray, in which it houses a function disable relay. This relay is normally-open and the OEM system enables its closure under a set of conditions. For example, if the OEM system is armed, it will not close the relay and thus, if the relay controls the current flow to the starter, the car will not start. In another example, the relay may prevent the operation of the fuel pump or fuel injection. Yet in another example, the relay will alter or disable the electrical ignition operation such as the delivery of spark to the engine.

Aftermarket security systems typically replace OEM normally-open relays with their own normally-open relays, and control the operation of their normally-open relays in conjunction with their parameters. In such aftermarket configurations, if the normally-open relay fails, the car is disabled. This causes frustration and OEMs often dispute such warranty claims.

The disclosed device, however, places an additional, normally-closed relay between the ignition switch and the functionality controlled by such normally-open relays. When the aftermarket security system is in the disarmed state, the normally-closed relay is dormant thereby allowing the circuit to complete its intended loop. In that case, the OEM security system continues to control the normally-open relay in accordance with the OEM functionality. However, when the aftermarket security system is enabled, the normally-closed relay will open the current flow and prevent the current from reaching its target, thereby disrupting or disabling the operation of the vehicle function.

In the event of a failure, the normally-closed relay will remain closed and dormant. Its functionally will be transparent to the operation of the OEM system. Therefore, the vehicle's operation will not be affected by a failed relay from an aftermarket security system.

DETAILED DESCRIPTION

Figure 1:
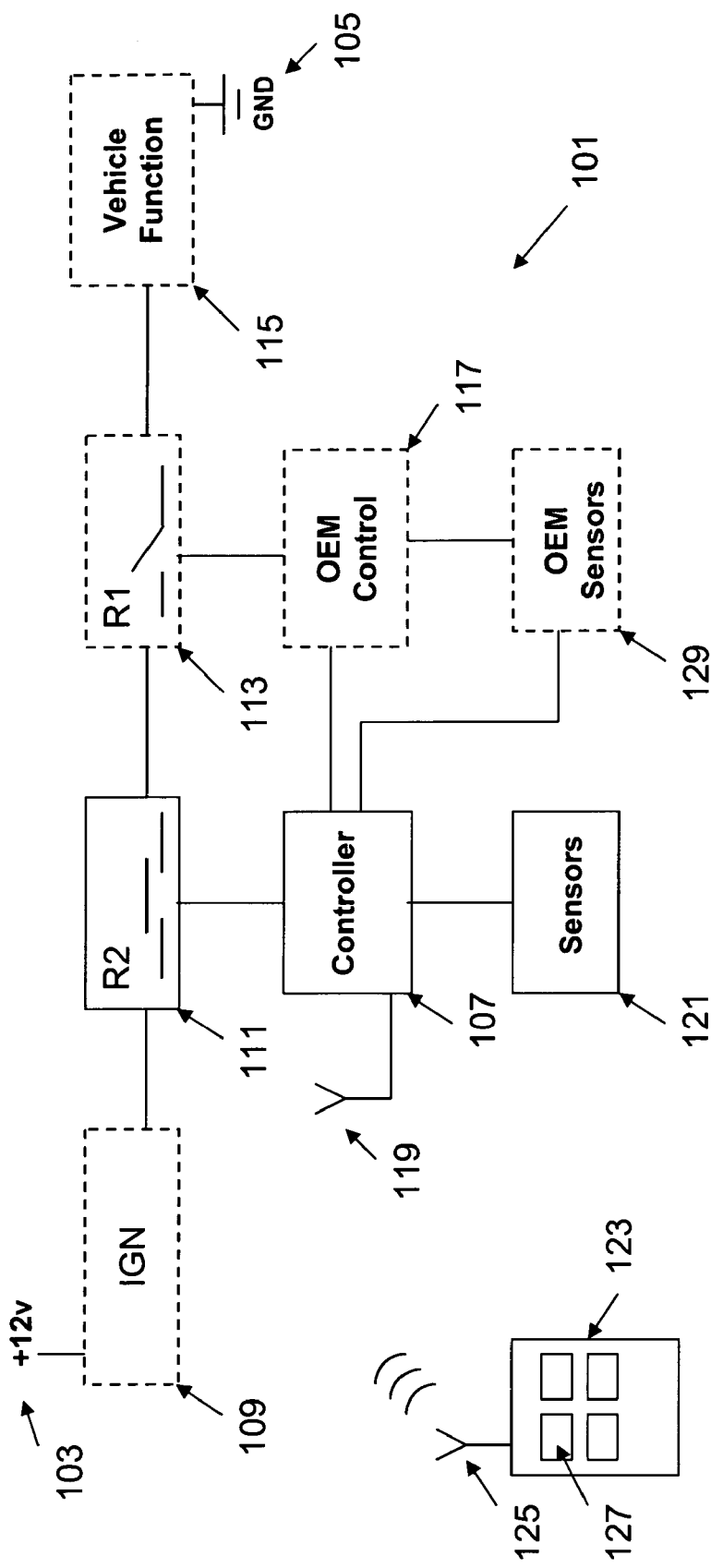
FIG. 1 illustrates a block diagram of the novel system with the normally-closed relay preceding the normally-open relay.

Shown in FIG. 1, in dashed lines, is an OEM vehicle system comprising a power source 103, such as a 12-volt battery or power generator (not shown). Power source 103 supplies power/current for the operation of the vehicle and one or more of its functions 115. A typical OEM vehicle system completes the circuit from power source 103 to a ground 105 through an ignition switch 109 by passing current through a first, normally-open relay ("R1") 113 to activate or maintain the functionality of one or more vehicle functions 115. Relay R1 113 is controlled by an OEM system 117. For example, when OEM system 117 is in its armed state, it controls relay R1 113 and prevents its closure. Therefore, electrical current does not flow through R1 113 and it does not enable or sustain the functionality 115. When OEM system 117 is in its disarmed state, R1 113 closes its terminals or is enabled to close in response to one or more control signals from OEM system 117 or the current at its terminal(s), thereby passing the current to vehicle functions 115 to initiate or sustain such functions.

The system 101 of FIG. 1 also illustrates additional components shown in solid lines. In this system 101, a normally-closed relay ("R2") 111 is placed between ignition switch 109 and relay R1 113. R2 111 is controlled by a controller 107 responsive to commands received from one or more authorized transmitters 123 or one or more sensors 121. When controller 107 is in an armed state, R2 111 changes its normally closed position to an open position responsive to the current flow initiated by ignition switch 109 when it is placed in the start position. Because R2 111 is placed in line with R1 113, current from source 103 does not flow to one or more vehicle functions 115. In the scenario where the vehicle function 115 is the starter, the vehicle does not start. Similarly, in the scenario where the vehicle function 115 is fuel control, one or more of the vehicle fuel pump and fuel injection does not operate or is changed in a way to inhibit normal operation of the vehicle. Also similarly, in the scenario where the vehicle function 115 is ignition circuitry, one or more of the vehicle starting ignition circuits, such as the starter, or spark distribution is altered in a way that disables or changes the normal operation of the vehicle. Just about every or multiple vehicle functions 115 could be altered in this way.

As mentioned before, in the system 101, R2 111 is a normally-closed relay. Accordingly, if R2 111 fails, it will fail in its closed position. The closed position failure could be structurally achieved by software programming or by a mechanical or electromechanical bias or some other component configuration. In that case, even if the controller 107 is armed, a failed R2 111 will remain closed, thereby passing current from power source 103 to R1 113 and/or vehicle functions 115. In other words, R2 111 in its failed, normally-closed position is functionally dormant and does not affect the OEM system 117 and its normally-open relay R1 113. In this failed state of R2 111, the additional components of system 101 do not inhibit the operation of the vehicle due to the failure of the relay R2 111.

Figure 2:
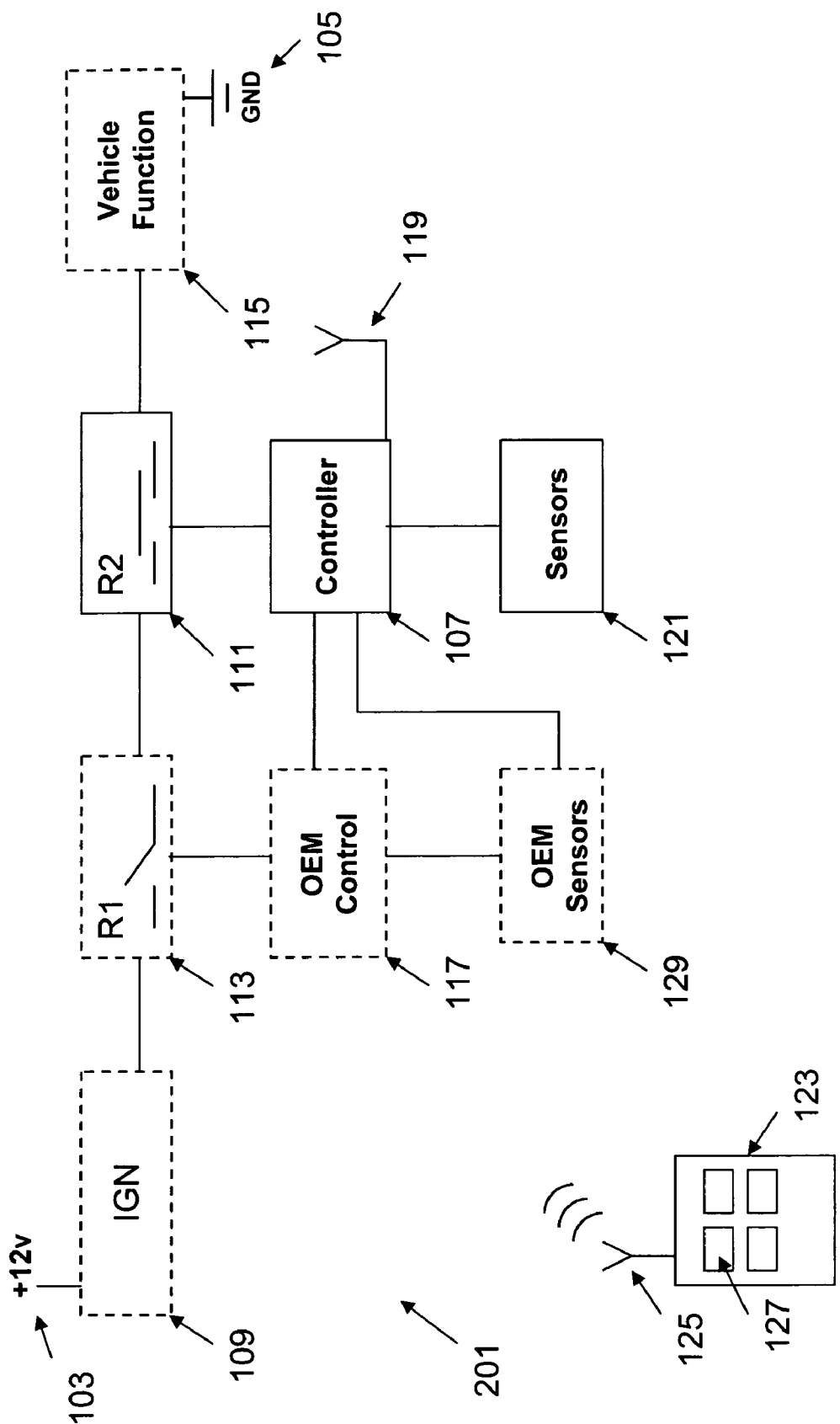
FIG. 2 illustrates a block diagram of the novel system with the normally-closed relay placed after the normally-open relay.

FIG. 2 illustrates a system 201, where the normally-closed relay R2 111 is placed in line between R1 113 and one or more vehicle functions 115. This arrangement is distinguished from the system of FIG. 1, where R2 111 is placed between R1 113 and ignition switch 109. In both systems, R2 111 appears dormant to the functionality of the vehicle because it fails in its closed position.

FIGS. 1 and 2 further disclose a transmitter 123. Transmitter 123 is the user controllable interface to the security system 101. The user can arm or disarm the controller 107 by exercising one or more switches 127 of transmitter 123. As an example, depressing one or more of the switches 127 may toggle the arm and disarm states of controller 107, open its doors, or windows or the trunk. Other transmitter controllable functions include a panic state in which the siren (not shown) or other alarm conditions are activated. Transmitter 123 also employs a memory (not shown) that stores a unique or pseudo-unique code. This unique code is not shared with other transmitters 123, or is one of a quantity of available codes that makes it unlikely that another person in the vicinity of the security system 101 or 201 will have a transmitter 123 with the same code. The pseudo-unique codes may be advantageous in applications where multiple transmitters 123 have the same code.

The transmitter 123, upon activation of one or more switches 125, wirelessly transmits to controller 107, via its transmitter (not shown) and antenna 125, a code word comprising the authorization code and the command code. Controller 107 respectively employs an antenna 119, which relays the signal received from the transmitter 123, to its receiver (not shown). The signal is decoded into the code word sent by transmitter 123. Then the authorization code of transmitter 123 is compared with one or more of the authorization codes stored in a memory (not shown) that resides in or is accessible to controller 107. If the transmitter 123 authorization code matches one of the authorized codes accessible to controller 107, controller 107 will respond to the received command. If it does not, the command is ignored.

A similar concept is also applicable in a non-wireless application, where the code or just the command is provided to controller 107. One way to accomplish this input is through a keypad (not shown) or through sensors 121. For instance, when ignition 103 is treated as one of the sensors 121, controller 107 will recognize its multiple on and off conditions within some designated period of time, such as ten (10) seconds, as an example. Therefore, a user is given the option to turn the ignition on and off N number of times in T number of seconds to arm and disarm the controller 107. Any other sensor, such as hood or trunk or door pins or any combination of sensors 121 or the same in combination with time elements, could be programmed to change controller 107 states or modes or functions.

In another embodiment, controller 107 may employ a dealer mode and a customer mode. A dealer mode is advantageous in a car lot setting, because the vehicles will be responsive to what is advantageously a short range transmitter 123. In the dealer mode, with multiple cars on the lot, it is advantageous to employ a single remote transmitter (123) that will be recognized by multiple controllers 107 installed in vehicles parked in a close vicinity to each other. In a normal setting, if a transmitter 123 code is programmed as an authorized code in multiple controllers 107, that are installed in multiple vehicles parked in the same sales lot, the arm or disarm command from a single remote 123 will affect multiple vehicles, thereby interfering with the activities of other lot attendants or the security of the vehicles. However, if the controller 107 employs a dealer mode, it will recognize commands of dealer transmitters 107, having a shorter transmission range, such that the transmitter has to be relatively close to the target controller 107. Target controller 107 will recognize the command from dealer transmitter 123, but controllers 107 of the adjoining cars will not.

Such dealer modes could also employ a subset of the features or control outputs of the controller 107. For example, controller 107 in the dealer mode could maintain the relay R2 111 in its closed position when armed. This would eliminate the remote possibility of the aftermarket system 107 and 111 preventing the vehicle from starting in a sales environment. However, in the same environment, the OEM system 117 and 113 will continue to function and provide its intended results, unaffected by the aftermarket system and in particular relay R2 111. Later, when the vehicle is sold, the lot attendant places the controller 107 in its learn mode and programs the unique authorization code of one or more customer transmitters 123 into the memory accessible to controller 107. Controller 107, in conjunction with the control input for programming customer remote transmitters 123, recognizes that it is programmed with one or more codes from a customer transmitter 123 and it remains thereafter in the customer mode. In the customer mode controller 107 is not responsive to signals received from dealer transmitters 123.

As disclosed above, in the dealer mode, controllers 107 may be set up to execute a subset of functionality or different functionality that is available in the customer mode. One such example is that in the dealer mode controller 107 does not enable relay R2 111 from opening or disabling the current path to vehicle functions 115. In one such embodiment, therefore, relay R2 111 will not prevent the car from being started even if controller 107 is armed (although the OEM systems may still prevent this functionality). However, in such embodiment as one example, the aftermarket security system 101 will open and close doors of the vehicle in response to authorized commands from dealer transmitters 123. This is advantageous, where the dealer does not want to take any chance that an aftermarket system will interfere with a successful sales process.

In another embodiment, in conjunction with changing from the dealer mode to the customer mode, the authorization code or codes of dealer transmitters 123 are deleted from the memory accessible to the controller 107. In one embodiment, controller 107 recognizes the code word of a customer transmitter 123 and enters into customer mode and out of the dealer mode. At the same time, controller 107 removes the authorization codes of dealer transmitters 123. In the customer mode, controller 107 enables a set of functions and features that is more robust than in the dealer mode. As described above, in one embodiment, relay R2 111 is enabled to provide security functions to the system 101 or 201. In another embodiment, a more robust feature set is available for selection or by default than in a dealer mode. Either way, the dealer transmitters 123 are no longer authorized and are not functional to operate the purchased vehicle. Yet in another embodiment, it may be desirable to specifically program out the dealer transmitters 123 by occupying the available authorized code memory space with the customer transmitter 123 codes, thereby pushing out, overwriting or otherwise disabling the dealer transmitter 123 codes.

In another embodiment, system 101 and 201 employ alert functionality providing feedback or monitoring of the system 101 or 201. In the event of one or more conditions sensed by sensors 121, a timing event or condition monitored by controller 107, or a query from the owner or authorized individual, controller 107 sends a message indicating the status of one or more of its sensors 121. Thus a parent or a manager may check on the location of the vehicle. Also, the system 101 or 201 could report whether one or more of its sensors 121 indicated an alarm condition. Yet in other embodiments, controller 107 could send GPS location data and/or speed or acceleration data to some receiver, such as a web site. This could be accomplished in a variety of ways, including a satellite link, a cell link or a 2-way pager link.

Also disclosed in FIGS. 1 and 2, are OEM sensors 129, which may exist on the vehicle prior to the installation of the aftermarket system 101 and 201. One example of such sensors are door-pin switches (not individually shown) 129 that essentially provide binary indication of whether a door, trunk or hood are opened. Instead of duplicating such sensors, in some instances the status of sensors 129 may be routable to controller 107. The same is true for sensors 121 routed to OEM control 117 (not illustrated). Also, in a like scenario, controller 107 may communicate or be linked to the OEM controller 117. Each would take advantage of one or more of the other's trigger lines, status lines or inputs.

While the present invention has been described herein with reference to particular embodiments thereof, a degree of latitude or modification, various changes and substitutions are intended in the foregoing disclosure. It will be appreciated that in some instances some features of the invention will be employed without corresponding use of other features without departing from the spirit and scope of the invention as set forth.

We claim:

1. A vehicle security system comprising:
   a) a controller comprising at least an armed state and a disarmed state, wherein said controller changes said states in response to at least one input;
   b) a first relay capable of switching from a normally open position to a closed position;
   c) a second relay connected to said first relay and said controller, and configured to gate said current to said first relay, said second relay configured to switch from its normally closed position, wherein said current is passed to said first relay, to an open position, wherein said current is not passed to said first relay;
   d) said second relay changing from said normally closed position to said open position responsive to at least one of said current and a control input if said controller is in said armed state, thereby preventing said current from flowing through said first relay to execute its at least one vehicle function;
   e) said second relay remaining in its normally closed position when said controller is in said disarmed state thereby passing said current to said first relay to execute its at least one vehicle function; and
   f) wherein said normally closed position of said second relay passes said current to said first relay if said second relay fails.

2. The vehicle security system of claim 1 wherein said system further comprises a receiver coupled to said controller, said receiver configured to receive a signal from a transmitter and said controller changing from said disarmed state to said armed state and from said armed state to said disarmed state in response to said signal.

3. The vehicle security system of claim 2 wherein said controller is responsive to an authorized signal, said controller further comprising a memory capable of storing said at least one authorized code, said authorized code distinguishing said authorized transmitter.

4. The vehicle security system of claim 2, wherein said transmitter is capable of sending said signal to said receiver wirelessly.

5. The vehicle security system of claim 1 wherein said vehicle function is chosen from the group consisting of: starting a vehicle by passing current from said first relay configured to close a starter solenoid and to activate a vehicle starter; enabling fuel supply; enabling fuel injection; enabling functionality of a brake system; enabling functionality of a vehicle electrical system.

6. The vehicle security system of claim 1 wherein the controller further comprises an alarm state, said controller in said alarm state communicating its alarm state from the group consisting of: an audible alarm, a visual alarm, a wireless signal communicating that said controller is in said alarm state; a wireless signal communicating the location of the vehicle; a wireless signal communicating the status of at least one sensor coupled to said controller.

7. The second relay of claim 1 wherein said second relay is biased in said normally closed position so that said second relay fails in said closed position.

8. The vehicle security system of claim 1 wherein said controller further comprises an alarm state activated in response to a signal from a transmitter.

9. The vehicle security system of claim 1 wherein said controller further comprises an alarm state activated in response to an input from at least one sensor.

10. The vehicle security system of claim 1 wherein said controller further comprises an alarm state activated in response to a timing condition.

11. A vehicle security system comprising:
    a) a controller comprising at least an armed state and a disarmed state, wherein said controller changes said states in response to at least one input;
    b) a first relay capable of switching from a normally open position to a closed position;
    c) a second relay connected to said first relay and said controller, and configured to gate said current from said first relay to at least one vehicle function, said second relay configured to switch from its normally closed position, wherein said current is passed to said at least one vehicle function, to an open position, wherein said current is not passed to said at least one vehicle function;

d) said second relay changing from said normally closed position to said open position responsive to at least one of said current and a control input if said controller is in said armed state, thereby preventing said current from flowing from said first relay to execute said at least one vehicle function;

e) said second relay remaining in its normally closed position when said controller is in said disarmed state thereby passing said current from said first relay to execute said at least one vehicle function; and f) wherein said normally closed position of said second relay passes said current from said first relay if said second relay fails.

12. The vehicle security system of claim 11 wherein said system further comprises a receiver coupled to said controller, said receiver configured to receive a signal from a transmitter and said controller changing from said disarmed state to said armed state and from said armed state to said disarmed state in response to said signal.

13. The vehicle security system of claim 12 wherein said controller is responsive to an authorized signal, said controller further comprising a memory capable of storing said at least one authorized code, said authorized code distinguishing said authorized transmitter.

14. The vehicle security system of claim 12, wherein said transmitter is capable of sending said signal to said receiver wirelessly.

15. The vehicle security system of claim 11 wherein said vehicle function is chosen from the group consisting of: starting a vehicle by passing said current to close a starter solenoid and to activate a vehicle starter; enabling fuel supply; enabling fuel injection; enabling functionality of a brake system; enabling functionality of a vehicle electrical system.

16. The vehicle security system of claim 11 wherein the controller further comprises an alarm state, said controller in said alarm state communicating its alarm state from the group consisting of an audible alarm, a visual alarm, a wireless signal communicating that said controller is in said alarm state; a wireless signal communicating the location of the vehicle; a wireless signal communicating the status of at least one sensor coupled to said controller.

17. The second relay of claim 11 wherein said second relay is biased in said normally closed position so that said second relay fails in said closed position.

18. The vehicle security system of claim 11 wherein said controller further comprises an alarm state activated in response to a signal from a transmitter.

19. The vehicle security system of claim 11 wherein said controller further comprises an alarm state activated in response to an input from at least one sensor.

20. The vehicle security system of claim 11 wherein said controller further comprises an alarm state activated in response to a timing condition.

21. A vehicle security system comprising:
a) a controller comprising at least an armed state and a disarmed state, wherein said controller changes said states in response to at least one input;
b) a first relay capable of switching from a normally open position to a closed position;
c) a second relay connected to said first relay and said controller, and configured to gate said current to said first relay, said second relay configured to switch from its normally closed position, wherein said current is passed to said first relay, to an open position, wherein said current is not passed to said first relay;

d) said second relay changing from said normally closed position to said open position responsive to at least one of said current and a control input if said controller is in said armed state, thereby preventing said current from flowing to said first relay to execute said at least one vehicle function;

e) said second relay remaining in its normally closed position when said controller is in said disarmed state thereby passing said current to said first relay to execute said at least one vehicle function; and f) wherein said normally closed position of said second relay passes said current to said first relay if said second relay fails;

g) wherein said first relay, said second relay and said controller are housed in a relay compartment of said vehicle.

22. The vehicle security system of claim 21 wherein said system further comprises a receiver coupled to said controller, said receiver configured to receive a signal from a transmitter and said controller changing from said disarmed state to said armed state and from said armed state to said disarmed state in response to said signal.

23. The vehicle security system of claim 22 wherein said controller is responsive to an authorized signal, said controller further comprising a memory capable of storing said at least one authorized code, said authorized code distinguishing said authorized transmitter.

24. The vehicle security system of claim 22, wherein said transmitter is capable of sending said signal to said receiver wirelessly.

25. The vehicle security system of claim 21 wherein said vehicle function is chosen from the group consisting of: starting a vehicle by passing current from said first relay configured to close a starter solenoid and to activate a vehicle starter; enabling fuel supply; enabling fuel injection; enabling functionality of a brake system; enabling functionality of a vehicle electrical system.

26. The vehicle security system of claim 21 wherein the controller further comprises an alarm state, said controller in said alarm state communicating its alarm state from the group consisting of: an audible alarm, a visual alarm, a wireless signal communicating that said controller is in said alarm state; a wireless signal communicating the location of the vehicle; a wireless signal communicating the status of at least one sensor coupled to said controller.

27. The second relay of claim 21 wherein said second relay is biased in said normally closed position so that said second relay fails in said closed position.

28. The vehicle security system of claim 21 wherein said controller further comprises an alarm state activated in response to a signal from a transmitter.

29. The vehicle security system of claim 21 wherein said controller further comprises an alarm state activated in response to an input from at least one sensor.

30. The vehicle security system of claim 21 wherein said controller further comprises an alarm state activated in response to a timing condition.

31. A vehicle security system comprising:
a) a controller comprising at least an armed state and a disarmed state, wherein said controller changes said states in response to at least one input;
b) a first relay capable of switching from a normally open position to a closed position;

c) a second relay connected to said first relay and said controller, and configured to gate said current from said first relay to at least one vehicle function, said second relay configured to switch from its normally closed position, wherein said current is passed from said first relay to said at least one vehicle function, to an open position, wherein said current is not passed from said first relay and to said at least one vehicle function;

d) said second relay changing from said normally closed position to said open position responsive to at least one of said current and a control input if said controller is in said armed state, thereby preventing said current from flowing from said first relay to execute said at least one vehicle function;

e) said second relay remaining in its normally closed position when said controller is in said disarmed state thereby passing said current from said first relay to execute said at least one vehicle function, wherein said normally closed position of said second relay passes said current from said first relay if said second relay fails; and f) wherein said first relay, said second relay and said controller are housed in a relay compartment of said vehicle.

32. The vehicle security system of claim 31 wherein said system further comprises a receiver coupled to said controller, said receiver configured to receive a signal from a transmitter, said signal controlling said input to said controller thereby changing said states of said controller from said disarmed state to said armed state and from said armed state to said disarmed state.

33. The vehicle security system of claim 32 wherein said controller is responsive to an authorized signal, said controller further comprising a memory with at least one authorized code, said authorized code communicated to said controller from said transmitter distinguishing said transmitter.

34. The vehicle security system of claim 32, wherein said transmitter is capable of sending said signal to said receiver wirelessly.

35. The vehicle security system of claim 31 wherein said vehicle function is chosen from the group consisting of: starting a vehicle by passing current from said first relay configured to close a starter solenoid and to activate a vehicle starter; enabling fuel supply; enabling fuel injection; enabling functionality of a brake system; enabling functionality of the electrical system.

36. The vehicle security system of claim 31 wherein the controller further comprises an alarm state, said controller in said alarm state communicating its alarm state from the group consisting of: an audible alarm, a visual alarm, a wireless signal communicating that said controller is in said alarm state; a wireless signal communicating the location of the vehicle; a wireless signal communicating the status of at least one sensor coupled to said controller.

37. The second relay of claim 31 wherein said second relay is biased in said normally closed position so that said second relay fails in said closed position.

38. The vehicle security system of claim 31 wherein said controller further comprises an alarm state activated in response to a signal from a transmitter.

39. The vehicle security system of claim 31 wherein said controller further comprises an alarm state activated in response to an input from at least one sensor.

40. The vehicle security system of claim 31 wherein said controller further comprises an alarm state activated in response to a timing condition.

41. A vehicle security system comprising:

a) a controller comprising at least an armed state and a disarmed state, wherein said controller changes said states in response to at least one input;

b) a first means for relaying a current, said first means capable of switching from a normally open position to a closed position;

c) a second means connected to said first means and said controller, for gating said current from said first means to at least one vehicle function, said second means configured for switching from a normally closed position, wherein said current is passed to said at least one vehicle function, to an open position, wherein said current is not passed to said at least one vehicle function;

d) said second means changing from said normally closed position to said open position responsive to at least one of said current and a control input if said controller is in said armed state, thereby preventing said current from flowing from said first means to execute said at least one vehicle function;

e) said second means remaining in its normally closed position when said controller is in said disarmed state thereby passing said current from said first means to execute its at least one vehicle function; and;

f) wherein said normally closed position of said second means passes said current from said first means if said second means fails.

42. The vehicle security system of claim 41 wherein said system further comprises a receiver means for receiving a signal from a transmitter, said receiver means coupled to said controller and said signal controlling said input to said controller thereby changing said states of said controller from said disarmed state to said armed state and from said armed state to said disarmed state.

43. The vehicle security system of claim 42 wherein said controller is responsive to an authorized signal, said controller further comprising a memory means for storing at least one authorized code, said authorized code communicated to said controller from said transmitter distinguishing said transmitter.

44. The vehicle security system of claim 42, wherein said transmitter is capable of sending said signal to said receiver wirelessly.

45. The vehicle security system of claim 41 wherein said vehicle function is chosen from the group consisting of: starting a vehicle by passing current from said first means configured to close a starter solenoid and to activate a vehicle starter; enabling fuel supply; enabling fuel injection; enabling functionality of a brake system; enabling functionality of the electrical system.

46. The vehicle security system of claim 41 wherein the controller further comprises an alarm state, said controller in said alarm state communicating its alarm state from the group consisting of: an audible alarm, a visual alarm, a wireless signal communicating that said controller is in said alarm state; a wireless signal communicating the location of the vehicle; a wireless signal communicating the status of at least one sensor coupled to said controller.

47. The second relay of claim 41 wherein said second relay is biased in said normally closed position so that said second relay fails in said closed position.

48. The security system of claim 41 wherein said controller further comprises an alarm state activated in response to a signal from a transmitter.

49. The security system of claim 41 wherein said controller further comprises an alarm state activated in response to an input from at least one sensor.

50. The security system of claim 41 wherein said controller further comprises an alarm state activated in response to a timing condition.

51. A vehicle security system comprising:
   a) a controller comprising at least an armed state and a disarmed state, wherein said controller changes said states in response to at least one input;
   b) a first means for relaying a current, said first means capable of switching from a normally open position to a closed position;
   c) a second means connected to said first means and said controller, for gating said current to said first means and to at least one vehicle function coupled to said first means, said second means configured for switching from a normally closed position, wherein said current is passed to said first means, to an open position, wherein said current is not passed to said first means;
   d) said second means changing from said normally closed position to said open position responsive to at least one of said current and a control input if said controller is in said armed state, thereby preventing said current from flowing to said first means to execute said at least one vehicle function;
   e) said second means remaining in its normally closed position when said controller is in said disarmed state thereby passing said current to said first means to execute its at least one vehicle function; and
   f) wherein said normally closed position of said second means passes said current to said first means if said second means fails.

52. The vehicle security system of claim 51 wherein said system further comprises a receiver means for receiving a signal from a transmitter, said receiver means coupled to said controller and said signal controlling said input to said controller thereby changing said states of said controller from said disarmed state to said armed state and from said armed state to said disarmed state.

53. The vehicle security system of claim 51 wherein said controller is responsive to an authorized signal, said controller further comprising a memory means for storing at least one authorized code, said authorized code communicated to said controller from said transmitter distinguishing said transmitter.

54. The vehicle security system of claim 51, wherein said transmitter is capable of sending said signal to said receiver wirelessly.

55. The vehicle security system of claim 51 wherein said vehicle function is chosen from the group consisting of: starting a vehicle by passing current from said first means configured to close a starter solenoid and to activate a vehicle starter; enabling fuel supply; enabling fuel injection; enabling functionality of a brake system; enabling functionality of the electrical system.

56. The vehicle security system of claim 51 wherein the controller further comprises an alarm state, said controller in said alarm state communicating its alarm state from the group consisting of: an audible alarm, a visual alarm, a wireless signal communicating that said controller is in said alarm state; a wireless signal communicating the location of the vehicle; a wireless signal communicating the status of at least one sensor coupled to said controller.

57. The second relay of claim 51 wherein said second relay is biased in said normally closed position so that said second relay fails in said closed position.

58. The security system of claim 51 wherein said controller further comprises an alarm state activated in response to a signal from a transmitter.

59. The security system of claim 51 wherein said controller further comprises an alarm state activated in response to an input from at least one sensor.

60. The security system of claim 51 wherein said controller further comprises an alarm state activated in response to a timing condition.

* * * * *